R. S. BERRY AND E. T. RUSHTON.
RIM TOOL.
APPLICATION FILED APR. 4, 1921.
1,434,244.
Patented Oct. 31, 1922.
3 SHEETS—SHEET 3.
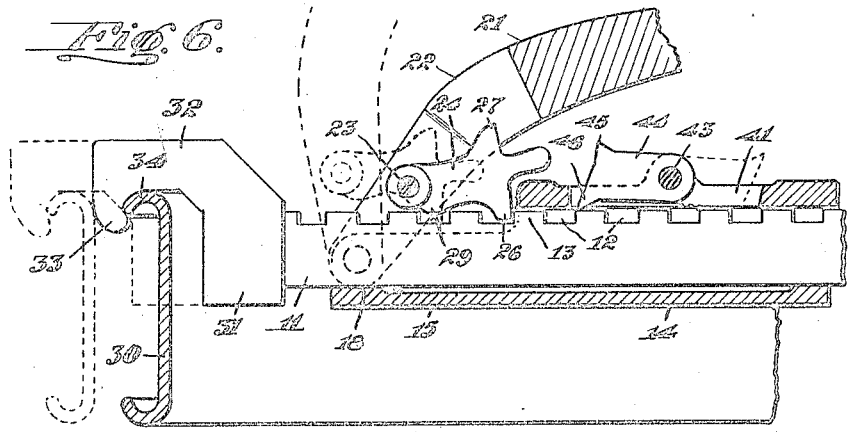
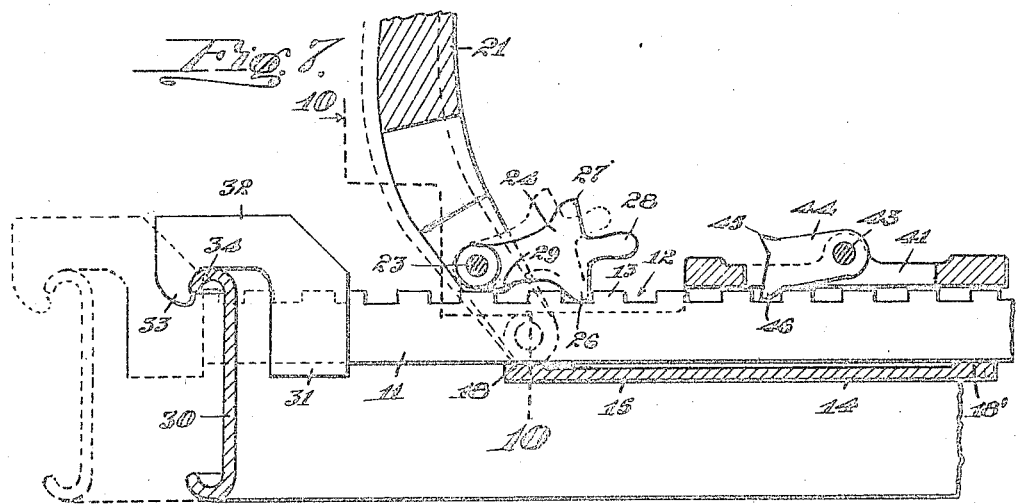
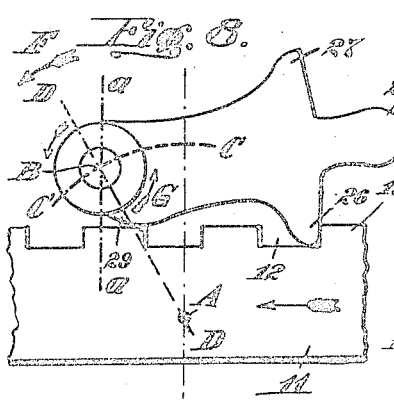 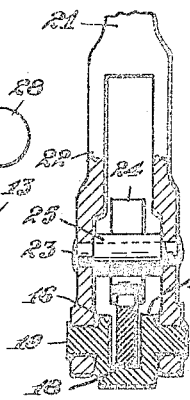 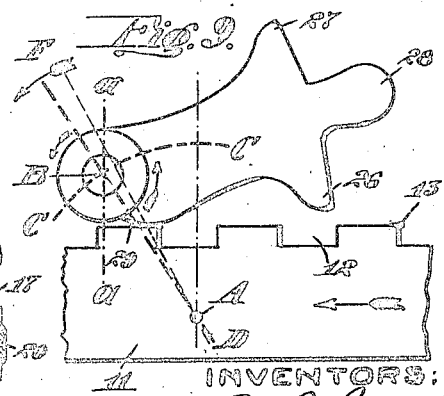
INVENTORS Patented Oct. 31, 1922.

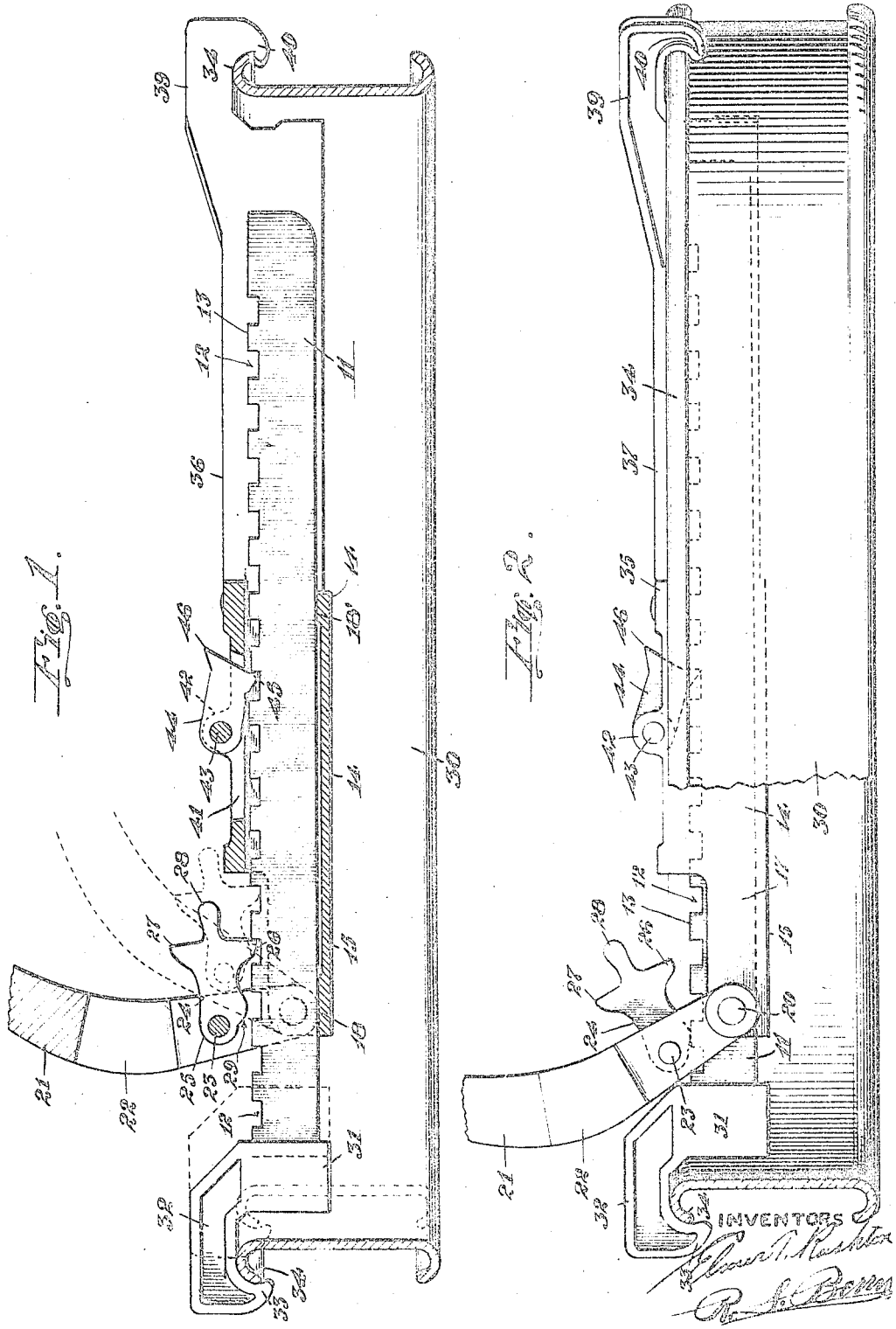

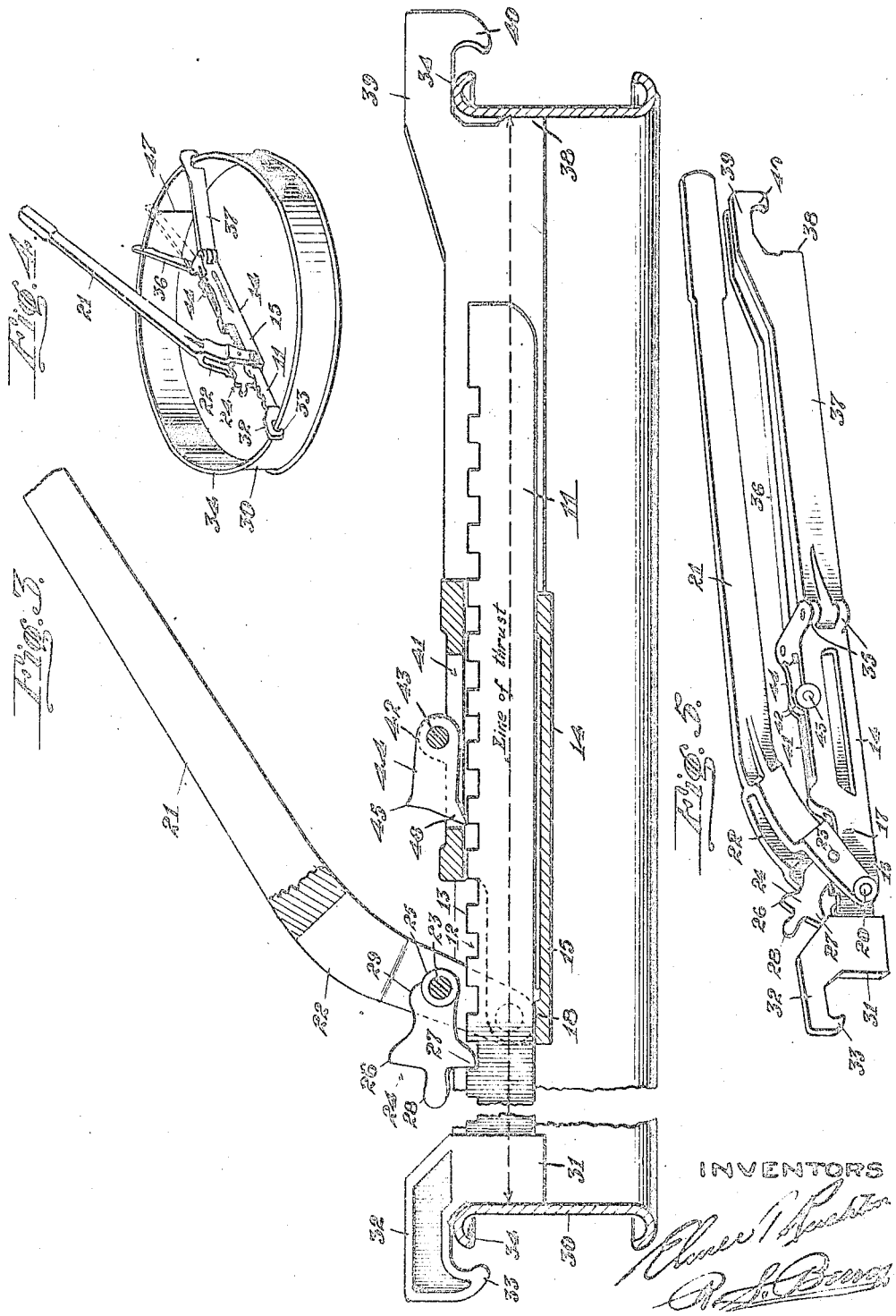

1,434,244

UNITED STATES PATENT OFFICE.

RENI S. BERRY, OF LOS ANGELES, CALIFORNIA, AND ELMER T. RUSHTON, OF ST. JOSEPH, MICHIGAN, ASSIGNORS TO HERCULES PRODUCTS COMPANY, OF ST. JOSEPH, MICHIGAN, A CORPORATION OF MICHIGAN.

RIM TOOL.

Application filed April 4, 1921. Serial No. 458,478.

*To all whom it may concern:*

Be it known that we, RENI S. BERRY, residing at Los Angeles, in the county of Los Angeles and State of California, and ELMER T. RUSHTON, residing at St. Joseph, in the county of Berrien and State of Michigan, both citizens of the United States, have invented new and useful Improvements in Rim Tools, of which the following is a specification.

This invention particularly pertains to a tool for expanding and contracting split wheel rims of the type employed as a mounting for pneumatic tires and which rims ordinarily comprise a metallic annulus having marginal tire engaging flanges and formed with a transverse split to permit the rim being contracted or shunk circumferentially in mounting and demounting a tire.

An object of this invention is to provide a tool which may be quickly applied to and removed from a rim and when in place on the rim to have such engagement therewith that the rim may be either contracted or expanded without removing and replacing the tool.

Another object is to provide a tool adapted to span a rim and be disposed to slidably engage both the inner and outer peripheries of the rim at various points, and also to provide connections which obviate the use of screws or clamps in applying the tool.

Another object is to provide a tool which is adapted to contract the rim step by step and to hold the rim in any desired contracted position to permit its being lifted by the tool, and Another object is to provide means whereby after the rim has been shrunk by the tool it may be freed and allowed to quickly expand under its own tension without removing the tool.

Another object is to provide an expanding and contracting tool embodying a notched bar, a lever, and a pawl on the lever engageable with the notched bar, in which the pawl may be automatically thrown out of engagement with the bar to permit the latter to move independent of the lever.

Another object is to provide a pawl and lever arrangement for operating a reciprocal bar in either direction whereby the point of engagement of the pawl with the bar and its mounting on the lever will be close to the fulcrum of the latter so that powerful leverage may be obtained.

A further object is to provide a tool of the class specified in which a pair of oppositely movable thrust members are actuated by a lever, and in which the parts are so relatively arranged that the opposite points of application of the thrusts will be substantially in alignment with the fulcrum point of the lever on one of the members and the connection between the lever and the other member located on such short radius from the fulcrum point that on operation of the lever the opposing forces will be practically alined or directly opposite each other.

In carrying out our invention to effect the objects above stated and such other objects or advantages as may subsequently appear, we have employed the construction and combination and arrangement of parts or their equivalents illustrated by way of example in the accompanying drawings, which show the preferred embodiment of the invention, and in which:

Figure 1 is a view in longitudinal section showing the tool as applied to a wheel rim with the parts as positioned in breaking and shrinking the rim.

Figure 2 is a view in side elevation of a rim with parts broken away showing the tool as applied and with the lever retracted and as about to be advanced to shrink the rim after it has been broken as indicated in dotted lines in Figure 1.

Figure 3 is a view in longitudinal section showing the tool as applied to a wheel rim positioned in readiness to expand the rim.

Figure 4 is a perspective view illustrating the manner of applying the tool to a split wheel rim.

Figure 5 is a perspective view showing the tool as folded.

Figure 6 is a detail in section illustrating the manner of letting out the rim after it has been contracted and showing the lever in full lines as advanced and in readiness to be retracted into the position shown in dotted lines.

Figure 7 is a detail in section showing the lever in a retracted position in letting out the rim and showing how the dog is automatically moved to a release position.

Figures 8 and 9 are diagrams showing the manner of throwing the dog out of engagement with the notched bar on retraction of the lever.

Figure 10 is a detail in cross section of the tool as seen on the lines 10—10 of Figure 7.

More specifically, 11 indicates a slide-bar of rectangular cross section having a series of notches 12 and teeth 13 on its upper edge the teeth being rectangular in form so that the end walls thereof will be straight and parallel throughout and extend at right angles to the edge of the bar and to the bottom of the notches. This slide-bar is mounted for longitudinal sliding movement in a tubular shank 14 and projects therethrough; the shank having rectangular end openings in which the slide-bar is guided. An extension 15 is formed on one end of the shank and projects beneath the slide-bar and has upwardly extending flanges 16 and 17 which project alongside each side of the slide-bar, as shown in Figure 10, and form a guide channel in continuation of the guide-way through the shank; the toothed upper edge of the bar being exposed in the channel. A rib 18 extends transversely between the flanges at the outer end of the extension and a rib 18' is formed at the outer end of the shank on which ribs the lower edge of the slide-bar bears. Formed on the outer faces of the flanges 16 and 17 adjacent the outer end of the extension are trunnions 19 and 20 which protrude opposite each other at a point intermediate the upper and lower edges of the slide-bar and form pivots on which a lever 21 is fulcrumed; the lever being formed with a yoke 22 which extends astride the slide-bar and the shank extension and engage the trunnions.

In mounting the lever on the trunnions, the side members of the yoke are spread apart sufficiently to permit their being placed astride the trunnions and are then bent to position the trunnions through openings formed in the yoke to receive them. The lever is thus pivoted on the shank at a point near the upper edge of the slide-bar and substantially opposite the longitudinal center of the latter, and is mounted at the outer end of the extension so that a number of the teeth on the slide-bar will be exposed on the inner side of the yoke.

Mounted on a pivot pin 23 carried by the yoke is a dog 24 which is formed with a sleeve 25 through which the pivot pin extends. The dog is designed to be swung on its pivot to extend on either side of the yoke into engagement with the slide-bar and to engage the latter close to the pivotal mounting of the lever and of itself. The dog is, therefore, quite short.

The yoke is of such length that the dog may be swung upwardly therethrough and the length of the shank extension 15 is such that when the dog is engaged with the slide-bar on the inner side of the yoke the lever may be rocked to its lowermost position before the dog touches the tubular shank. The dog being short permits the yoke and the extension 15 being correspondingly short.

The outer end of the dog is formed with a pair of oppositely extending spurs 26 and 27 adapted to engage the teeth on the slide-bar according to whether the dog is arranged to extend on one side of the yoke or the other, thus rendering the dog reversible and double acting. The end faces of the spurs are substantially flat to conform to the vertical ends of the teeth and the tips of the spurs are slightly rounded so that they may be readily disengaged from the teeth on swinging the dog upwardly on its pivot. A finger piece 28 is formed on the end of the dog between the spurs by which it may be readily grasped to lift the pawl and swing it from one side of the yoke to the other.

An important feature of this invention resides in forming the dog with a protuberance or hump 29 on one edge thereof adjacent to its pivotal mounting, which protuberance constitutes a kick-out cam and is designed to be moved into contact with the upper edge of the slide-bar on rocking the lever and acts to automatically lift the dog out of engagement with the bar, as will be later described, the protuberance being spaced such distance from the tip of the spur 26 that when the lever is retracted with the dog engaging a tooth and extending substantially in a horizontal position, the protuberance will be positioned to bear on the upper edge of a tooth, as particularly shown in Figures 8 and 9.

The pivotal mounting 23 of the dog is disposed as close to the upper edge of the bar as possible and yet afford enough clearance as to permit sufficient stroke of the lever to effect movement of the bar a distance substantially corresponding to or slightly greater than the combined length of a tooth and a notch of the bar, which has been found in practice to be most desirable at about one inch.

The pivotal mounting of the lever is preferably disposed at about one and three-eighths inches from the pivotal mounting of the dog, which with a length of lever of about twenty inches provides sufficient leverage to adapt the tool for use in expanding and contracting large and heavy types of wheel rims with ease, but these dimensions may be varied according to the size of tool desired and to the work it is intended to perform.

The outer end of the bar 11 is designed to be positioned to abut against the inner periphery of a wheel rim 30 and is also intended to have engagement with the outer periphery of the rim. For the latter purpose, a sleeve 31 is rigidly secured to the end portion of the bar and is formed with an upwardly and outwardly extending bracket portion 32 having a downturned bill 33 adapted to hook over the edge of the rim; the bill being spaced from the end of the sleeve and bar such distance as to permit its being readily placed astride a side flange 34 with which the rim is formed and to be spaced from the flange when the end of the bar is positioned to abut against the rim, as shown in Figure 3.

Formed on the end of the tubular shank 14 opposite the mounting of the lever and projecting from each side thereof is a pair of spaced bosses 35 forming yokes on which a pair of arms 36—37 are pivotally mounted; the arms being adapted to be folded together to extend substantially parallel with each other in continuation of the shank, and to be swung on their pivotal mounting to space their outer ends apart and arrange either or both of the arms in angular relation to the shank. The outer ends of the arms are formed with shoulders 38 located opposite the outer end of the bar 11 and substantially in alignment with the pivotal mounting of the lever, which shoulders are adapted to be arranged to abut against the inner periphery of the wheel rim. As a means for adapting the arms to be engaged with the outer periphery of the wheel rim, they are formed with upwardly and outwardly extending bracket portions 39 terminating in downturned bills 40 which are spaced such distance from the shoulders 38 that when the latter are arranged against the inner face of the rim the bills will clear the flange 34 on the rim, as shown in Figure 3.

The tubular shank 14 is formed with a longitudinal slot 41 in its upper wall, and projecting upwardly on opposite sides of the slot intermediate its ends are lugs 42 carrying a pivot pin 43 on which a reversible pawl 44 is mounted; the pawl being formed at its outer end with oppositely extending spurs 45 and 46 either of which is engageable with the teeth on the slide bar according to whether the pawl is positioned to extend toward one end of the shank or the other. The pawl 44 is thus double acting and may be disposed to engage the bar to prevent movement of the latter in either a forward or rearward direction and yet permit its movement in the other direction.

In the operation of the invention, the slide bar is adjusted in the shank according to the span of the rim to be operated upon so that the tool may be disposed with the brackets 32 and 39 seating on the edge of the rim with the outer end of the slide bar, and the shoulders on the outer ends of the arms disposed adjacent the inner periphery of the rim.

It is to be noted that when the tool is seated on the rim, the pivotal point of the lever will be located at a point on a plane between the edges of the rim, and that the toothed upper edge of the bar will also be disposed on a plane within the rim, which arrangement is advantageous in that opposed thrusts on the rim will be substantially aligned and applied from within the rim.

In "breaking" the rim, the arms 36 and 37 may be arranged to extend on opposite sides of the split 47 of the rim, as shown in Figure 4, with one of the arms located close to the split, as indicated in dotted lines, and the other arm spaced therefrom, or both the arms may be engaged with the rim on one side of the split. The lever 21 is then disposed in the raised position, as indicated in full lines in Figure 1, and the dog 24 swung to the inner side of the lever and engaged with one of the teeth on the bar, and the pawl 44 is positioned to extend in the same direction as that of the dog 24; the bills being engaged with the flange on the rim, as shown in Figure 1. Downward movement of the lever will then act to advance the bar and shank relative to each other; the bar being free to move beneath the pawl 44 on this retracting movement. In this manner, an inward pull may be exerted on the rim to divide or break the latter at the split 47 to position the portions of the rim adjacent the split in an overlapping position.

To shrink the rim, the arms are spread apart while engaged with the rim, being free to slide thereon, and are disposed about equi-distant on opposite sides of the split, as shown in full lines in Figure 4. The lever is then raised, the dog engaged with another tooth, and the lever depressed to advance the bar and shank relative to each other a distance slightly greater than the combined length of a tooth and notch; the pawl 44 engaging a tooth on the bar when the lever has neared the end of its down stroke, as shown in Figure 1, to hold the bar against retrograde movement under the pull exerted by the contracted rim which will now be placed under heavy tension. This operation shrinks or contracts the rim and may be repeated such number of times as to shrink the rim sufficiently to permit its being freed from a tire thereon. The tool is thus worked step by step to contract the rim. The pawl 44 now acts to hold the rim in its contracted position between the bills. After the rim has been shrunk, the lever is rocked to its upwardly extending position, as shown in Figure 2, whereupon it may be employed as a handle and the tool lifted with the rim attached to remove the rim from the tire. The rim may thus be held in its contracted position until replaced in the tire and without detaching the tool.

When it is desired to release the rim and permit it to expand to normal, the lever and dog are operated to advance the bar in the shank such distance that the pawl 44 may be disengaged from the bar and reversed in position, as shown in Figure 6; the lever then being in its depressed position. On retraction of the lever the rim will expand under its tension and will exert outward pulls on the bar and shank causing the bar to follow the dog, as indicated in dotted lines in Figure 6, until the protuberance 29 on the dog seats on the upper edge of a tooth on the bar, as shown in Figures 7 and 8, whereupon a slight upward or forward movement of the lever will act to force the dog out of engagement with the bar thereby automatically releasing the latter so that the rim will expand to its normal position with a single retracted movement of the lever irrespective of the number of steps employed in contracting the rim.

The action of the dog as just described is particularly illustrated in diagram in Figures 8 and 9, in which A indicates the fulcrum of the lever, B the pivotal center of the dog, C—C the arc of travel of the center B, D—D represents the lever, and a—a indicates the vertical center of the pivotal center B. When the lever is retracted in letting the rim expand and disposed on line D—D, Figure 8, the protuberance 29 on the dog will be disposed to one side of the center a—a and will seat on the bar to the side of the center of the pivot B toward the outer end of the dog. On forcing the lever in the direction of arrow F an upward pressure will be exerted on the dog in the direction of arrow G, so that when the force applied to the lever is sufficient to overcome the pressure of the bar on the end of the dog, the latter will move upwardly out of engagement with the bar, as shown in Figure 9, so that the bar may freely slide beneath the dog when the lever is disposed on line D—D, as shown in Figure 9, and as indicated in dotted lines in Figure 7. The dog being then disposed out of engagement with the bar, the rim by reason of being under tension when contracted will quickly expand to normal and in so doing carries the bar therewith, as indicated in dotted lines in Figure 7; the rim being thus free to expand any distance under its tension with a continuous and practically instantaneous movement.

To expand the rim after it has been released and restored to normal the dog is reversed to extend on the opposite or forward side of the lever and engaged with the bar, as shown in Figure 3. This reversal of the dog may be readily effected manually, but it frequently occurs that on withdrawal of the dog from engagement with the bar as above described, sufficient impulse will be imparted to the dog as to cause it to automatically swing upward and over into its reversed position. The lever is then lowered to bring the dog into engagement with a tooth, so that on upward movement of the lever the shank and bar will be moved outwardly relative to each other to bring the end of the bar and the ends of the arms against the inner surface of the rim, so that continued upward movement of the lever will act to expand the rim. Ordinarily, one operation of the lever will advance the bar and shank relative to each other such distance as to expand the rim sufficiently to permit the end portions of the rim being connected together, but in event, two or more steps are necessary the reversed pawl 44 will engage the bar to permit a number of bites being taken. When the end of the bar and the ends of the arms are positioned against the rim, the bills will be spaced from the flange of the rim, so that when the rim has been expanded and its end portions connected the tool may be lifted and quickly removed from the rim.

From the foregoing, it will be seen that the four operations required in detaching and connecting a rim and tire consisting in first breaking the rim, shrinking the rim, releasing the rim to permit it to expand under its own tension, and finally expanding the rim, may be performed by the use of this tool without disengaging the tool from the rim, and that the tool may be quickly applied to and removed from a rim. It will also be seen that by advancing or retracting the bar and shank relative to each other, the tool may be readily adjusted to fit wheel rims of various sizes.

While we have shown and described the tool specifically, we do not limit ourselves to the exact details of construction set forth, but may employ such changes, modifications, and equivalents of the parts and arrangement thereof as come within the scope of the appended claims and without departing from the spirit of the invention.

We claim:

1. In a tool for expanding and contracting split wheel rims, a pair of telescoping members slidable longitudinally relative to each other, one of said members having teeth formed thereon, a lever pivoted on the other of said members, a dog pivoted on said lever adapted to engage the toothed member, and means cooperating between the dog and the toothed member controlled by the operation of said lever for automatically lifting said dog out of engagement with the toothed member.

2. In a tool for expanding and contracting split wheel rims, a pair of telescoping members slidable longitudinally relative to each other, one of said members having teeth formed thereon, a lever pivoted on the other of said members, a dog pivoted on said lever adapted to engage the toothed member, and means on said dog co-operating with the toothed member adapted to lift the dog out of engagement with said member.

3. A tool for contracting and expanding split wheel rims comprising, a pair of telescoping members slidable longitudinally relative to each other, one of said members having teeth formed thereon, a lever pivoted on one of the members, a dog pivoted on said lever adapted to engage the teeth on the other member; said dog formed with a protuberance adapted to bear on the toothed member to lift the dog out of engagement with said member, and wheel rim engaging means on each of said members.

RENI S. BERRY.
ELMER T. RUSHTON.